United States Patent
Ha et al.

(10) Patent No.: US 9,513,718 B2
(45) Date of Patent: Dec. 6, 2016

(54) USER ACTION REMOTE CONTROL

(75) Inventors: Wai-leung Ha, Pokfulam (HK); Kairy Kai Lei, Shen Zhen (CN); Gordon Qian, Shen Zhen (CN)

(73) Assignee: Computime, Ltd., Hong Kong (HK)

( * ) Notice: Subject to any disclaimer, the term of this patent is extended or adjusted under 35 U.S.C. 154(b) by 1659 days.

(21) Appl. No.: 12/051,618

(22) Filed: Mar. 19, 2008

(65) Prior Publication Data

US 2009/0241052 A1   Sep. 24, 2009

(51) Int. Cl.
| | | |
|---|---|---|
| G06F 3/0346 | (2013.01) | |
| G06F 3/01 | (2006.01) | |
| H04N 5/44 | (2011.01) | |
| H04N 21/422 | (2011.01) | |

(52) U.S. Cl.
CPC ............. *G06F 3/0346* (2013.01); *G06F 3/017* (2013.01); *H04N 5/4403* (2013.01); *H04N 21/42208* (2013.01); *H04N 21/42222* (2013.01); *G08C 2201/10* (2013.01); *G08C 2201/32* (2013.01); *H04N 2005/4428* (2013.01)

(58) Field of Classification Search
USPC ................................................ 715/863, 740
See application file for complete search history.

(56) References Cited

U.S. PATENT DOCUMENTS

| | | |
|---|---|---|
| 7,176,887 B2 | 2/2007 | Marvit et al. |
| 2002/0142701 A1* | 10/2002 | Rosenberg ............. G05D 1/005 446/454 |
| 2003/0193572 A1* | 10/2003 | Wilson et al. ........... 348/207.99 |
| 2004/0095317 A1 | 5/2004 | Zhang et al. |
| 2005/0102699 A1* | 5/2005 | Kim et al. ....................... 725/81 |
| 2005/0231414 A1* | 10/2005 | Chu et al. ...................... 341/175 |
| 2006/0241864 A1* | 10/2006 | Rosenberg .................... 701/213 |

(Continued)

FOREIGN PATENT DOCUMENTS

| | | |
|---|---|---|
| CN | 2565092 Y | 8/2003 |
| CN | 1912948 A | 2/2007 |

(Continued)

OTHER PUBLICATIONS

Wikipedia.org, "Remote Play," Mar. 13, 2008, http://en.wikipedia.org/w/index.php?title=Remote_Play&oldid=197747814.*

(Continued)

*Primary Examiner* — Maryam Ipakchi
(74) *Attorney, Agent, or Firm* — Banner & Witcoff, Ltd.

(57) ABSTRACT

The present invention supports the control of a plurality of controlled devices. With three dimensional accelerometer components, detection of a user action on a remote controller and the orientation of the remote controller are viable through small electronic devices. Aspects of the invention are based on the three dimensional accelerometer components to provide a remote controller that can detect the user action. Based on the user action, the remote controller transmits a signal to the controlled device which conveys the corresponding command. A selected controlled device may be matched to the remote controller. The remote controller and controlled device may also support a learning mode, in which the controlled device sends a list of supported commands to the remote controller. The remote controller then matches an associated action with each command in the command list.

1 Claim, 7 Drawing Sheets (56) References Cited

U.S. PATENT DOCUMENTS

| | | | |
|---|---|---|---|
| 2007/0080940 A1 | 4/2007 | Aoki et al. | |
| 2007/0101356 A1* | 5/2007 | Walrath ........................ | 725/25 |
| 2007/0130582 A1 | 6/2007 | Chang et al. | |
| 2007/0273583 A1* | 11/2007 | Rosenberg .................... | 342/367 |
| 2008/0291160 A1* | 11/2008 | Rabin ........................... | 345/156 |
| 2009/0198354 A1* | 8/2009 | Wilson .......................... | 700/90 |
| 2009/0222452 A1* | 9/2009 | Bagg et al. .................... | 707/10 |
| 2010/0138798 A1* | 6/2010 | Wilson et al. ................ | 715/863 |
| 2014/0368412 A1* | 12/2014 | Jacobsen ............. | G02B 27/017 |
| | | | 345/8 |

FOREIGN PATENT DOCUMENTS

| | | |
|---|---|---|
| CN | 101150874 A | 3/2008 |
| EP | 1335338 A3 | 5/2007 |
| JP | 2006324900 A | 11/2006 |

OTHER PUBLICATIONS

International Search Report for PCT/CN2009/070879, dated Jun. 25, 2009, pp. 1-7.

Further examination report in related GB 1013374.2, mailed May 25, 2012, pp. 1-4.

"F1 on the PS3—PSP in the Rear View," Digital Displacement, May 9, 2006, pp. 1-2.

* cited by examiner

USER ACTION REMOTE CONTROL

BACKGROUND OF THE INVENTION

Remote controllers for video and audio devices and home appliances are very popular. Remote controllers typically use a using key pad for input. With newly developed touch technologies, input may be entered through a touch pad with a sliding or circular input. However, end users still need to control the device with the user's fingers. Moreover, having a dedicated remote controller for each controlled device is not desirable when there are a plurality of controlled devices. Consequently, a remote controller often controls a plurality of devices.

There is a real market need to facilitate controlling a plurality of controlled devices through a remote controller by a user.

SUMMARY OF THE INVENTION

The present invention provides methods, computer readable media, and apparatuses for remotely controlling a plurality of controlled devices. With three dimensional accelerometer components, detection of a user action on a remote controller and the orientation of the remote controller are viable through small electronic devices. Aspects of the invention are based on the three dimensional accelerometer components to design a remote controller that can detect the action of the user, e.g., flipping up, down, or rotating the remote controller. Based on the user action, the remote controller transmits a signal to the controlled device which conveys the corresponding command. Targeted controlled devices include, but are not limit to, window blinds, window shades, projector screens, lighting fixtures, fans, air-conditioning systems, audio and video equipment.

With another aspect of the invention, a remote controller senses motion on the remote controller through an accelerometer. Accelerometer information is processed to determine the orientation of the remote controller in order to control a selected controlled device from a plurality of controlled devices. Also, user actions on the remote controller are determined from the accelerometer information. A user action is converted to a command, and a signal is transmitted to the selected device that conveys the command.

With another aspect of the invention, a user action is matched to a plurality of predetermined actions. The matched action is mapped to the corresponding command.

With another aspect of the invention, a selected controlled device is matched to the remote controller. The selected controlled device may be matched through preprogramming or by a user pressing a match key on the controlled device.

With another aspect of the invention, a remote controller and controlled device support a learning mode. The controlled device sends the remote controller a list of supported commands. The remote controller than matches an associated action with each command in the command list.

With another aspect of the invention, when a remote controller is essentially stationary, the remote controller enters a standby mode in order to reduce power consumption.

BRIEF DESCRIPTION OF THE DRAWINGS

The foregoing summary of the invention, as well as the following detailed description of exemplary embodiments of the invention, is better understood when read in conjunction with the accompanying drawings, which are included by way of example, and not by way of limitation with regard to the claimed invention.

DETAILED DESCRIPTION

With three dimensional accelerometer components, detection of action and orientation are viable through small electronic devices. Aspects of the invention are based on the three dimensional accelerometer components to provide a remote control that can detect the action of the user, e.g., flipping up, down, or rotating the remote controller. Based on the user action, the remote controller transmits a signal to the controlled device to convey the corresponding command. Controlled devices include, but are not limited to, window blinds, window shades, projector screens, lighting fixtures, fans, air-conditioning systems, and audio and video (A/V) equipment.

Figure 1:
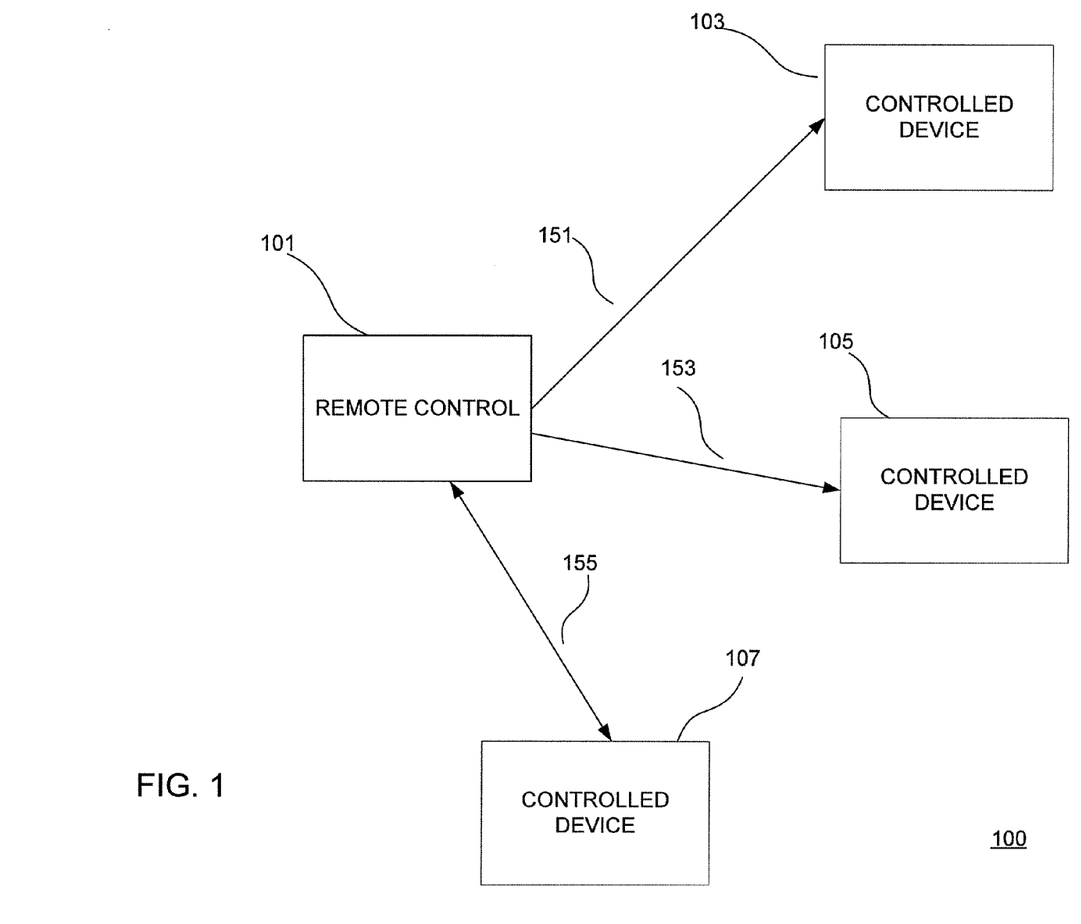
FIG. 1 shows a remote controller controlling a plurality of controlled devices in accordance with an embodiment of the invention.

FIG. 1 shows system 100 in which remote controller 101 controls a plurality of controlled devices (e.g., controlled devices 103-107) in accordance with an embodiment of the invention. Controlled devices may be different types of devices, including a television, window blinds, lighting fixture, audio/visual equipment, and heating/air-conditioning (HVAC) system.

With an embodiment of the invention, remote controller 101 sends signals to controlled devices 103, 105, and 107 over communications channels 151, 153, and 155, respectively. As shown in the exemplary embodiment in FIG. 1, communications channels 151 and 153 are one-way (from remote controller 101 to controlled device 103 or 105) so that a command can be conveyed to the controlled device. Moreover, communications channel 155 is two-way so that controlled device 107 can also send configuration information (e.g., the command list supported by the controlled device) to remote controller 101 as will be further discussed.

Figure 2:
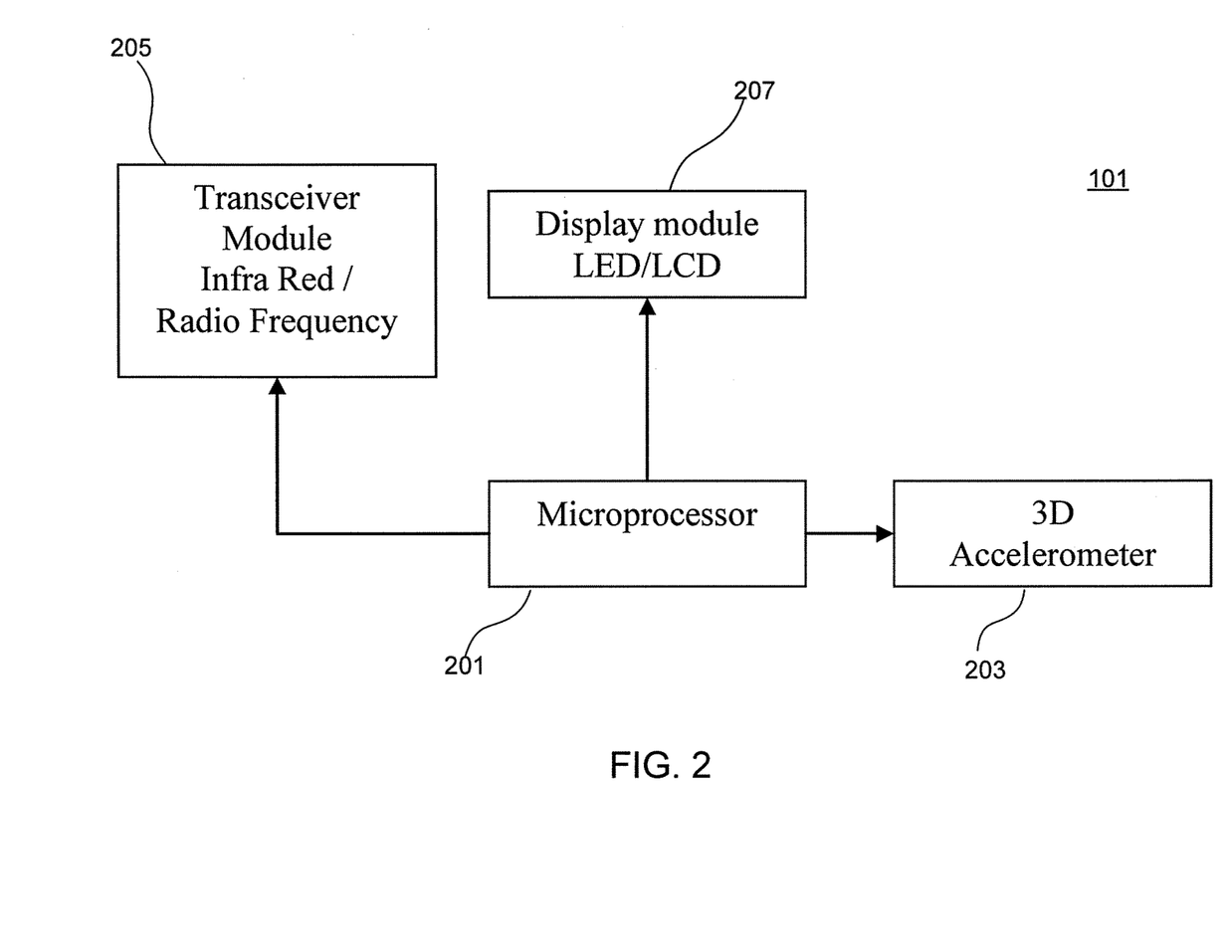
FIG. 2 shows a block diagram of a remote controller in accordance with an embodiment of the invention.

FIG. 2 shows block diagram 200 of remote controller 101 in accordance with an embodiment of the invention. Remote controller 101 includes processor 201 that obtains accelerometer information from accelerometer 203. Processor 201 processes the accelerometer information to determine the orientation of remote controller 101 and to determine the user action (e.g., linearly up, linearly down, or circular) that is imposed on remote controller 101. The user action is subsequently mapped to a predetermined action, which corresponds to a command for the controlled device. Processor 201 then instructs transceiver 205 to transmit a signal, which contains command information, to the controlled device.

Remote controller 101 recognizes an action from the end user that is applied to the remote controller. Exemplary actions that can be detected from accelerometer 203 include:

up swing
up swing with return
down swing
down swing with return
left swing
left swing with return
right swing
right swing with return
clockwise circle
anti-clockwise circle
slant up from left to right
slant up from right to left
slant down from left to right
slant down from right to left The user action is mapped to a predefined action, which corresponds to a command. For example, remote controller 101 may command a television to change to the next channel when moved with an up swing with a return movement.

Referring to FIG. 1, remote controller 101 may control a plurality of controlled devices. An output signal from remote controller 101 can match a command with a user action recognized for different devices. For example, when controlling the light level of electric lamp, the user swings remote controller 101 up or up with return. The action matches with the light level up command. The light level of the lamp consequently will increase. The level can also be proportional to the acceleration of the swing movement by the user. The faster the acceleration, the brighter will be the level. When the user swings remote controller 101 down or down with return, the light level dims according to the acceleration detected.

The user can swing remote controller 101 upward or up with a return movement in order to move the window blinds upward. Remote controller 101 consequently sends a signal to the window blinds with a contained command to move the blinds upward. In order to stop the upward action, the user can impose a clockwise or anti-clockwise circular motion on remote controller 101.

Transceiver 205 may operate at different frequencies, corresponding to radio frequency, infrared, and visible light. Transceiver 205 typically comprises a transmitter portion and a receiver portion that operate from a common frequency source so that the transmit frequency and the receive frequency are related by a constant frequency offset. If only one-way communication is supported, transceiver 205 may be replaced with a transmitter without a corresponding receiver.

Processor 201 may utilize display 207 to indicate the selected controlled device being controlled for the corresponding orientation of remote controller 101. For example, in the vertical position, remote controller 101 may control a fan, while in the vertical position remote controller 101 may control a lighting system.

When remote controller 101 is resting at a predefined orientation, e.g., horizontal or vertical, remote controller 101 enters the standby or sleep mode to reduce battery consumption. Based on the application and the characteristics of a typical user, one can experimentally determine an acceleration threshold below which remote controller 101 is considered essentially stationary. Also, when remote controller 101 is positioned at a certain orientation for long time, remote controller 101 may enter into the standby or sleep mode.

Referring to FIG. 1, one approach for matching the devices 103-107 and remote controller 101 is through pre-programming in remote controller 101 and controlled devices 103-107.

Another approach is to use two-way transceiver for both remote controller 101 and controlled devices 103-107. An input key at a controlled device can be used as a matching key. When the matching key of a selected controlled device is pressed by the user, remote controller 101 can be moved to the corresponding orientation and swing with a predefined pattern, e.g., Up→Down→Up→Down→Up for confirming with the device.

The selected controlled device can have at least one key as the "Matching" key to match the orientation of the remote to the device. With other embodiments, an additional "Learning" key is needed to enter both the selected controlled device and remote controller 101 into the learning mode. In the learning mode, remote controller 101 receives the command list from the selected controller device. The user is consequently instructed to perform appropriate actions for learning.

When remote controller 101 receives the command from the selected controlled device with a list of commands for learning corresponding actions, remote controller 101 enters into the action learning mode. The corresponding command may be displayed either on a light emitting diode (LED) indicator or a liquid crystal display (LCD). The end user can teach remote controller 101 different actions in order to control the selected controlled device.

Figure 3:
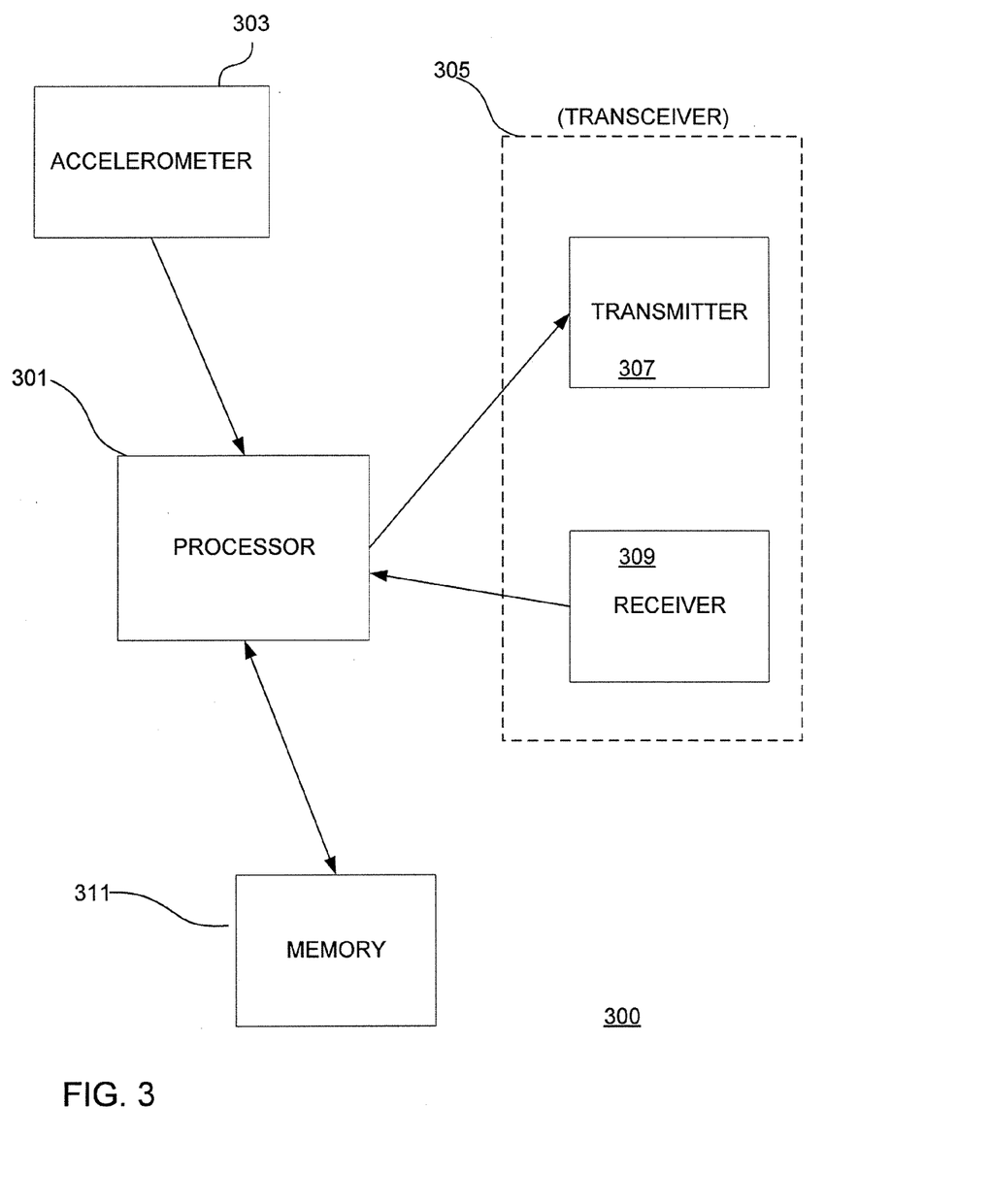
FIG. 3 shows a block diagram of a remote controller in accordance with an embodiment of the invention.

FIG. 3 shows a block diagram 300 of remote controller 101 in accordance with an embodiment of the invention. Processor 301 receives accelerometer information from accelerometer 303. Processor 301 processes the accelerometer information in accordance with computer-executable instructions from memory 311. Memory 311 may include different forms of computer-readable media that can be accessed by processor 301. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

When processor 301 determines the user action imposed on remote controller 101, processor 301 then converts the user action into a command and inserts the command in the signal sent to the controlled device through transceiver 305. Transceiver 305 includes both transmitter 307 and receiver 309. However, if only one-way communication is supported, transceiver 305 may be replaced with transmitter 307.

Figure 4:
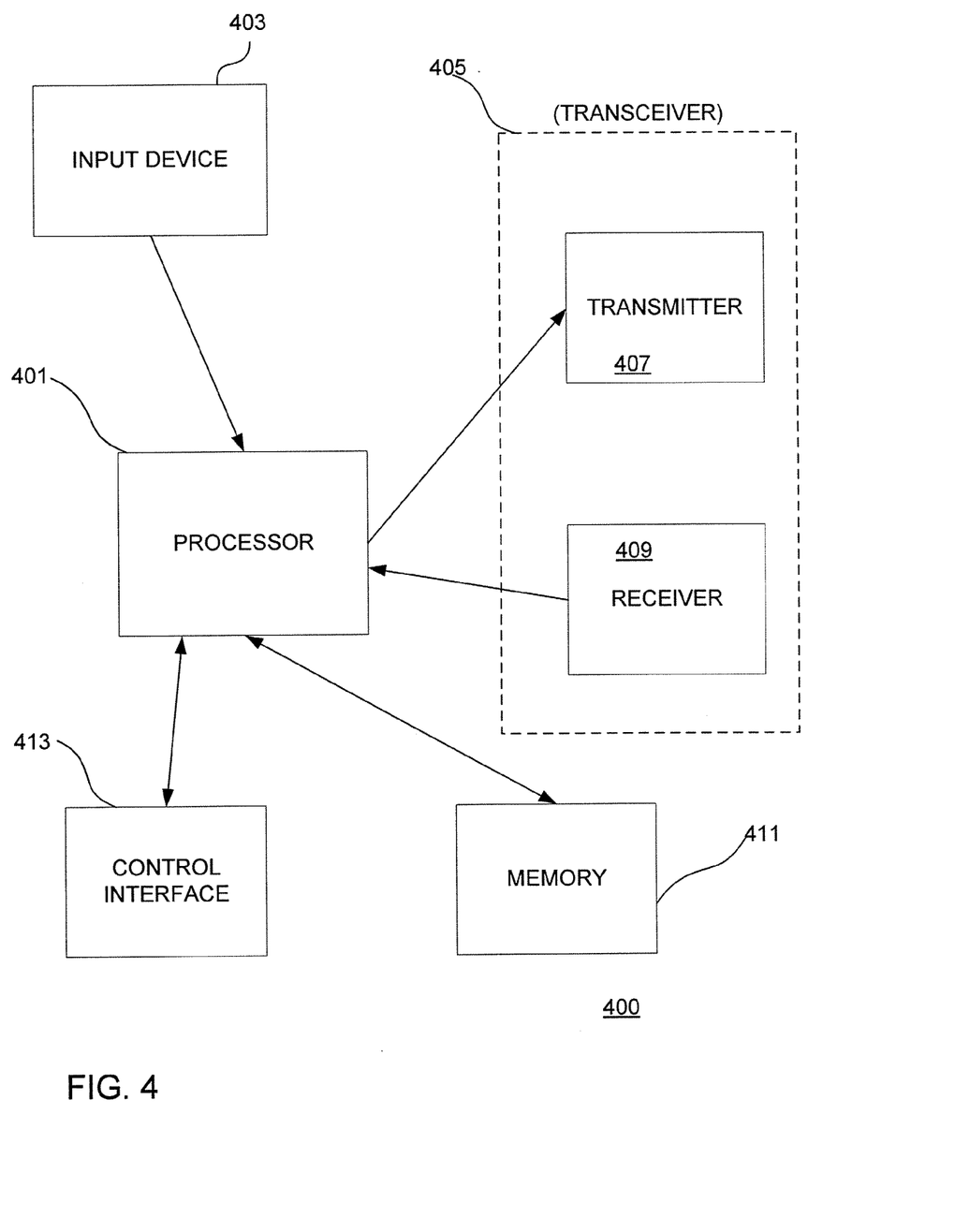
FIG. 4 shows a block diagram of a controlled device in accordance with an embodiment of the invention.

FIG. 4 shows block diagram 400 of a controlled device (e.g. controlled device 107) in accordance with an embodiment of the invention. Processor 401 receives a signal through transceiver 405 in order to control the controlled device. Transceiver 405 includes both transmitter 407 and receiver 409. However, if only one-way communication is supported in which the controlled device only receives a signal from controlled device 101, then transceiver 405 may be replaced with receiver 409.

Once processor 401 determines the command from the received signal, processor 401 instructs the controlled device to execute the command through control interface 413. For example, processor 401 may instruct a lighting fixture to increase the level of intensity by increasing the duty cycle of the provided power signal to a light.

The controlled device may also include input device 403 to provide a key input when matching the controlled device to remote controller 101 or to support the learning mode.

Processor 401 processes the signal from transceiver 405 in accordance with computer-executable instructions from memory 411. Memory 411 may include different forms of computer-readable media that can be accessed by processor 401.

Computer-readable media may comprise storage media and communication media.

Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Figure 5:
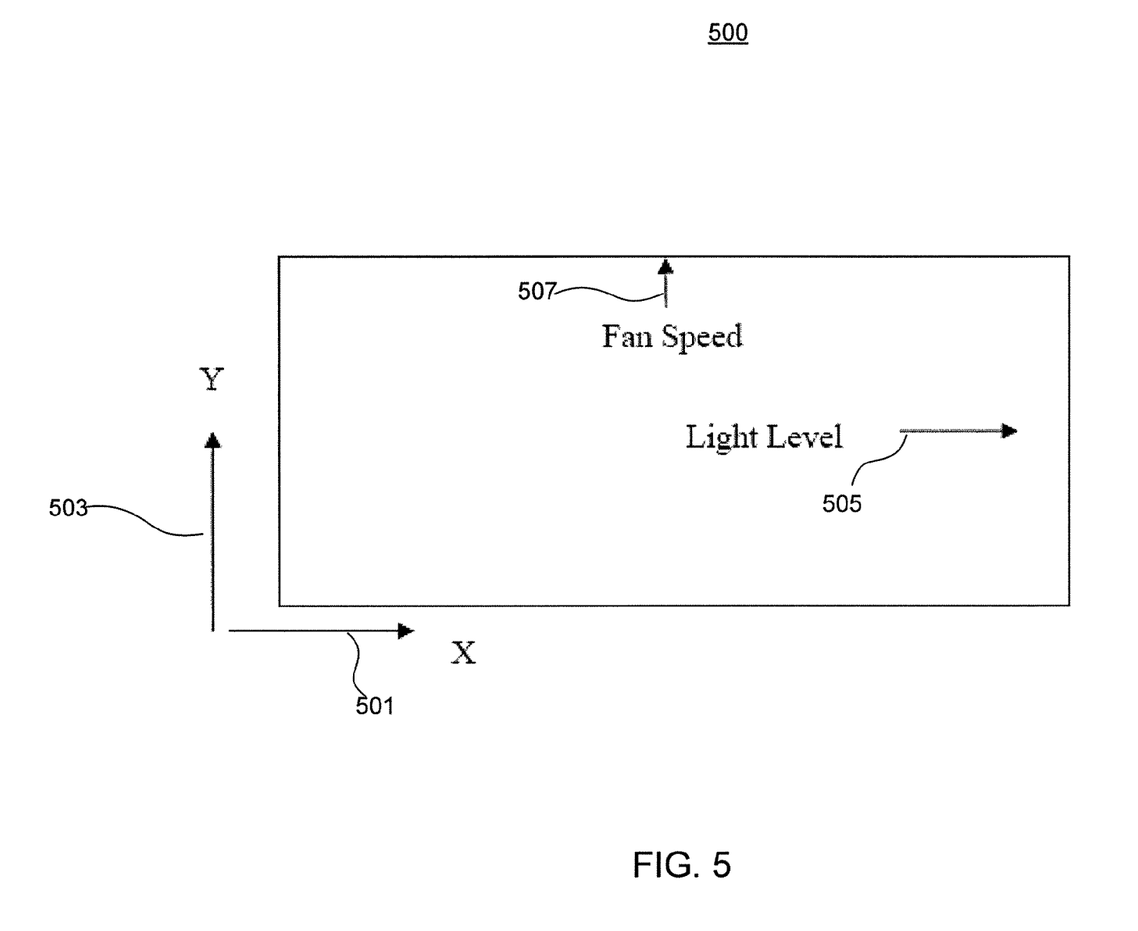
FIG. 5 shows different user actions that may be imposed on a remote controller to control different controlled devices in accordance with an embodiment of the invention.

FIG. 5 shows different user actions that may be imposed on remote controller 500 to control different controlled devices in accordance with an embodiment of the invention. Remote controller 500 may assume different physical shapes including a square, rectangle, circular, eclipse, or sphere. The user can rotate remote control 500 to a predefined orientation in order to control a controlled device from a plurality of controlled devices. For example, for rectangle remote control 500 as shown in FIG. 5: When remote controller 500 is lifted with Y direction 503 upward, remote controller 500 is used to control the fan speed of a fan. When remote controller 500 is lifted with X direction 501 upward, remote controller 500 is used to control light level 505.

Figure 6:
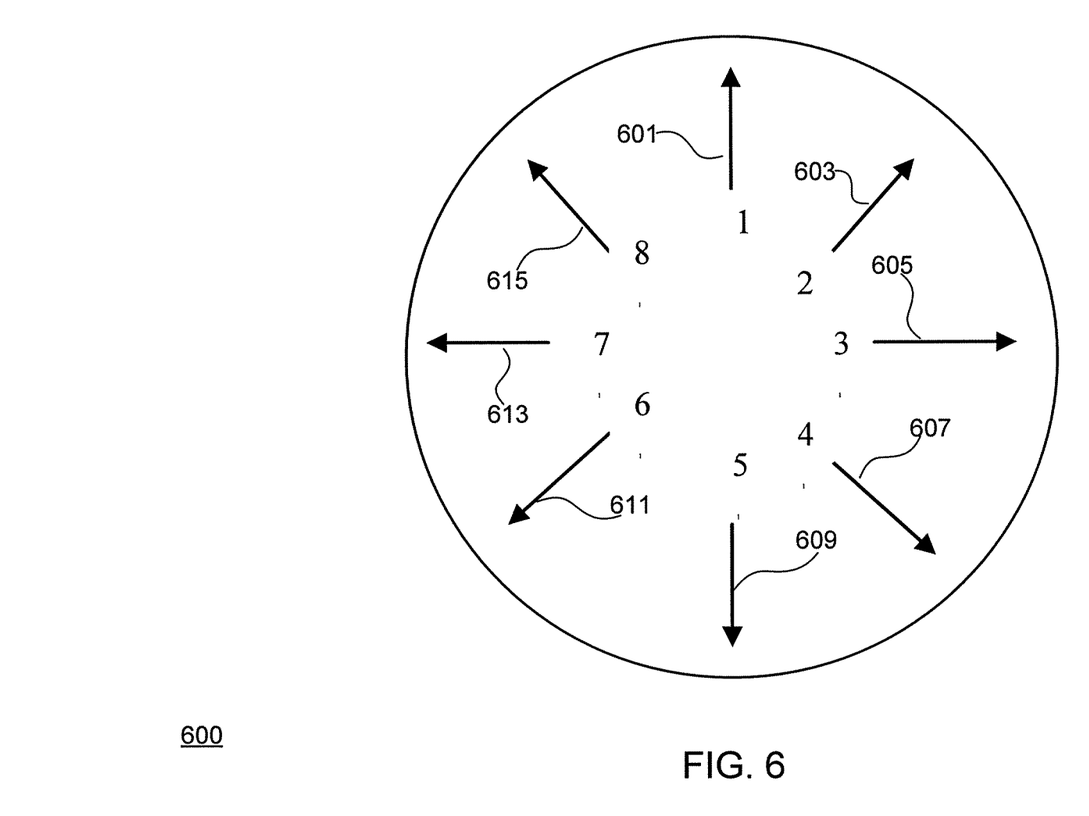
FIG. 6 shows different user actions that may be imposed on a remote controller to control different groups of lighting devices in accordance with an embodiment of the invention.

FIG. 6 shows different user actions that may be imposed on remote controller 600 to control different groups of lighting devices in accordance with an embodiment of the invention. Remote controller 600 has a circular shape remote control for multiple lighting controls based on orientations 601-615. Remote controller 600 can control eight sets/groups of the lighting in any location. For example, when remote controller 600 is rotated with arrow 4 pointing upward (corresponding to orientation 607, group 4 lighting can be controlled by remote controller 600. In order to control another group of lighting, the user can simply rotate remote controller 600 with the corresponding orientation pointing upward.

A corresponding indicator (e.g., LED display or LCD 207 as shown in FIG. 2) may be used to indicate which device or device group that remote controller 600 is currently controlling as feedback to the end user.

Referring to FIG. 2, accelerometer 203 may provide accelerometer information to three dimensions (X, Y, and Z). Consequently, remote controller 101 can control numerous controller devices.

Figure 7:
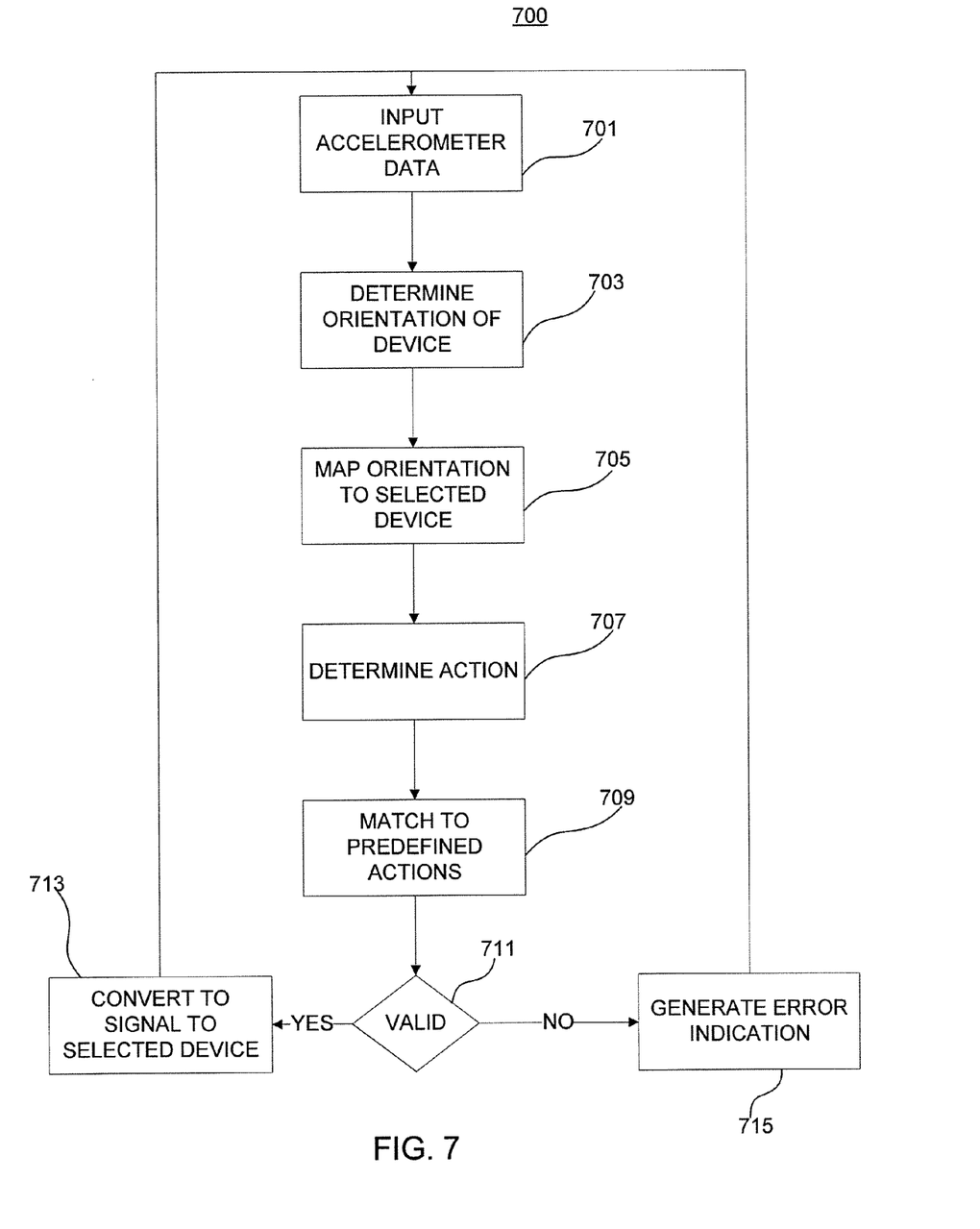
FIG. 7 shows a flow diagram for a remote controller in accordance with an embodiment of the invention.

FIG. 7 shows flow diagram 700 for a remote controller in accordance with an embodiment of the invention. In step 701, accelerometer information is obtained from accelerometer 203 (referring to FIG. 2). From the accelerometer information, processor 101 determines the orientation of the remote controller (e.g., whether the remote controller is positioned with vertically or horizontally) in step 703. The selected controlled device is determined from the orientation in step 705. If the user has imposed an action on the controlled device (e.g., moving the remote controller up or circularly), processor 201 determines the type of user action in step 707. Processor 201 compares the user action to the set of predefined actions and determines the corresponding predefined action in step 709. The following Table illustrates a set of predefined actions. If the user action matches one of the predefined actions in step 711, processor 201 converts the user action to the corresponding command and inserts the command in a signal that is transmitted to the selected controlled device in step 713. If the user action does not match one of the predefined actions in step 711, then processor 201 generates an error indication on display 207 in step 715. (For example, if the user action is slant up left to right when controlling the window blinds, then the user action is deemed to be in error.) Alternatively, processor 201 may ignore the user command and wait for the next valid user command.

TABLE

MAPPING OF USER ACTIONS TO COMMANDS

| Predefined Action | Controlled Device | Command |
| --- | --- | --- |
| Up swing | Television | Power on |
| Down swing | Television | Power off |
| Right swing | Television | Channel up |
| Left swing | Television | Channel down |
| Clockwise circle | Television | Volume up |
| Counter-clockwise circle | Television | Volume down |
| Slant up left to right | Television | Mute |
| Slant down right to left | Television | Unmute |
| Up swing with return | Window blinds | Open blinds |
| Up swing | Window blinds | Open blinds |
| Down swing with return | Window blinds | Close blinds |
| Down swing | Window blinds | Close blinds |
| Clockwise circle | Window blinds | Stop motion of blinds |
| Counter-clockwise circle | Window blinds | Stop motion of blinds |

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
an accelerometer configured to sense motion of the apparatus;
a transmitter;
a receiver cooperatively coupled to the transmitter to operate as a transceiver;
a processor configured to:
select a first selected device from a plurality of controlled devices;
receive a received signal with a first predetermined command list containing a plurality of commands from the first selected device through the receiver of the apparatus over a two-way communications channel, wherein the plurality of commands are supported by the first selected device to control the first selected device;
map a plurality of user actions with the plurality of commands in the first predetermined command list;
receive accelerometer data from the accelerometer;
determine a first orientation of the apparatus from the accelerometer data;

determine a user action applied to the apparatus by a user from the accelerometer data, wherein the user action is one of the plurality of user actions;
convert the user action to a first command for the first selected device, wherein the first command is included in the first predetermined command list;
determine an amount of acceleration from the accelerometer data;
adjust a level of the first command based on the amount of acceleration; and
the transmitter electrically coupled to the processor and configured to transmit a transmitted signal containing command information indicative of the first command to the first selected device, wherein the first selected device is controlled by the apparatus.

* * * * *